Jan. 27, 1942. W. H. LONGSTREET 2,271,269
LOCKING DEVICE FOR AIR CHUCKS
Filed April 4, 1940
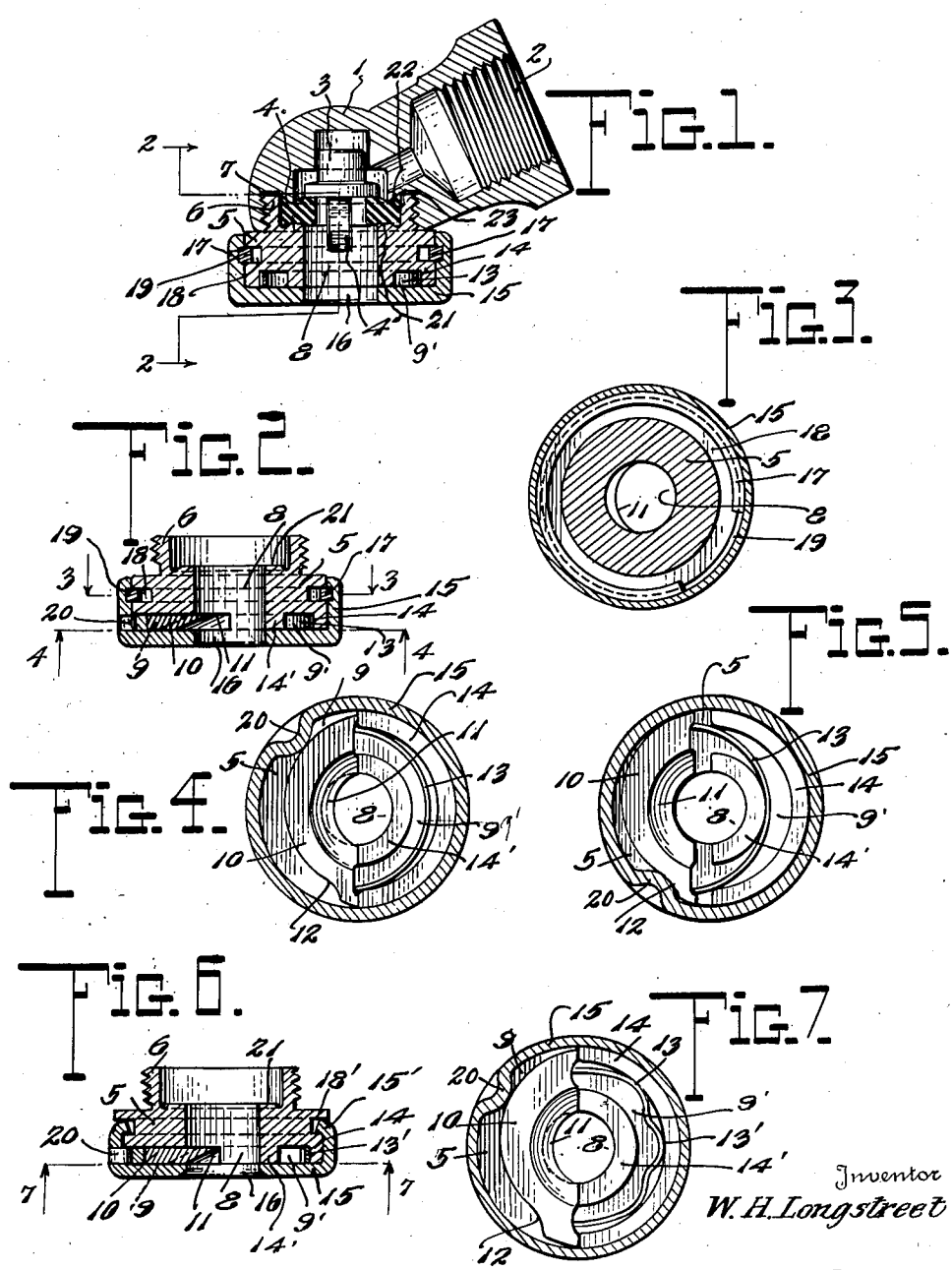
Inventor
W. H. Longstreet
By Robb & Robb
Attorneys Patented Jan. 27, 1942

2,271,269

UNITED STATES PATENT OFFICE 2,271,269

LOCKING DEVICE FOR AIR CHUCKS

Walter H. Longstreet, Brooklyn, N. Y., assignor to Acme Air Appliance Company, Inc., Brooklyn, N. Y., a corporation of New York Application April 4, 1940, Serial No. 327,908

9 Claims. (Cl. 284—17)

The present invention relates to improvements in locking devices, and particularly to that type designed for locking air line chucks to the valve stems of vehicle tires during the operation of inflating said tires.

As is well known, the manipulation of the air line terminal when inflating a tire or other object involves some difficulty, especially in connection with air lines having therein an air gauge which is necessarily operated from time to time during the inflation to determine the tire pressure, in view of the fact that one hand is usually required to hold the valve stem in proper position and the other hand of the operator must hold the air chuck on the end of the stem so as to prevent displacement during the inflation operation. Such manipulation is, therefore, greatly facilitated by employing a means to interengage the chuck positively with the valve stem, and thereby allowing free use of both hands of the operator to perform the other functions above referred to.

It is the object of this invention to provide a simple and effective locking means for the purpose, comprising a body portion in which is mounted a detent or locking element adapted to be shifted into engagement with the threads on the end of the valve stem by manually operable means connected with said body portion, thus establishing a positive connection between the valve stem and the air line.

In carrying out the object of my invention, I employ a locking connector device or attachment unit having a stem-receiving opening and air passage therethrough, and formed with a recess therein in which the detent is disposed and held in inoperative relation to said passage by a spring element and a rotary cap or ring having camming means for shifting the detent against the tension of said spring element transversely of the stem-receiving opening so as to engage with the threaded extremity of the valve stem when the latter is introduced into the said opening.

Other and further objects and advantages of the invention will be hereinafter described and the novel features thereof defined in the appended claims:

In the drawing:

Figure 1 is a vertical sectional view through an air chuck and locking device constructed in accordance with my invention;

Figure 2 is a transverse sectional view taken about on the plane indicated by the line 2—2 of Figure 1;

Figures 3 and 4 are transverse sectional views on the respective lines 3—3 and 4—4 of Figure 2;

Figure 5 is a sectional view similar to that of Figure 4, showing the locking element in its release position as distinguished from the locking position shown in Figure 4;

Figure 6 is a vertical sectional view of a slightly modified form of locking attachment; and Figure 7 is a transverse sectional view on the line 7—7 of Figure 6.

Like reference characters designate corresponding parts in the several figures of the drawing.

The locking device of my invention is preferably constructed in the form of an attachment unit which may be readily applied to the conventional air chuck on the end of an air line by the mere removal of the customary retaining ring for holding the valve means of said chuck and substituting therefor said locking device in the position shown in Figure 1 of the drawing. The chuck in this figure is thus composed of the head 1 to which the air line is adapted to be connected by a coupling which screws into the threaded opening 2. Said head is suitably chambered to receive the valve member 3 having a depresser extension 4', and said valve is normally seated upon the compressible rubber gasket 4, which is clamped in place in the head by the locking device now to be described, and constituting the subject matter of the present invention.

The locking attachment referred to above comprises the body portion 5 which is formed with a threaded sleeve extension 6 at its upper end to enable it to be screwed into the threaded entrance 7 of the chuck head 1. The body portion 5 is formed with an air passage 8 adapted to receive the valve stem of a vehicle tire when it is desired to connect the air line to said stem. At the lower end, the body portion 5 is formed with a semi-circular recess or depression 9 to receive an arcuate-shaped locking detent 10, so that said detent will lie at one side of the air passage 8. The detent is formed at one side with a knife edge 11, and in its opposite edge with a dwell 12. The edge of said locking element leading from the dwell is gradually inclined to form a camming surface with which a camming device cooperates for shifting the locking element in a direction transverse to the air passage. The sliding detent thus described is held in its normal position by means of a semi-circular leaf spring 13 mounted in the recess 9' at the opposite side of the air passage and with its ends engaging the opposite ends of the detent, as shown clearly in Figure 5 of the drawing. This spring 13 is normally straight or only slightly curved and, when inserted in the channel 9' between the semi-annular shoulders 14 and 14', it is put under tension with its side near its ends engaging the opposite ends of the semi-annular shoulder 14 and has a tendency to straighten or flatten out, the sides of the spring sliding on the ends of the curved wall or shoulder 14.

The ends of the semi-annular shoulders 14 and 14' also provide stop means limiting lateral movement of the detent 10 toward the air passage 8, and also prevent any tendency of the detent to rotate with the camming means 20 on the retaining cap 15 later described.

This spring and locking element are held in the recess by means of a retaining cap or ring 15, provided with an opening at 16, registering with the air passage 8. The cap is swively connected to the body portion 5 by means of a locking ring 17 engaging in an annular groove 18 in the body portion and a corresponding groove 19 in the cap.

In the form of the device shown in Figure 6, the cap flange 15' is turned inwardly to engage in the groove 18' in the body portion by way of modification of the method of connecting said cap to the body portion. This form of the construction of Figure 6 differs not only in this respect from that shown in Figures 1 to 5, but also with respect to the form of spring coacting with the locking detent, said spring, as shown in Figure 7, being formed intermediate its length to provide a contact point 13' cooperating with the shoulder 14.

In both of the constructions illustrated, the cap 15 is depressed at one side so as to provide a cam or inwardly-extending projection 20, which is designed to seat in the dwell 12 in the normal release position of the locking device, and to ride on the back edge of the locking element 10 when the cap is rotated to effect locking of the connector to a valve stem. In said locking operation, it will be apparent that the knife edge 11 will move inwardly of the air passage until it engages between the threads on the end of the valve stem and thus establish a positive interlock for holding the air line in place during the inflation of a tire in the customary manner. When the cap member is rotated in a reverse direction, the cam projection 20 rides downwardly of the cam edge of the locking member and into the dwell 12, while the spring 13 shifts the locking member out of engagement with the valve stem until the locking member reaches its inoperative position as shown in Figure 5 of the drawing. Owing to the formation of the spring and its cooperation with the annular shoulder 14, the locking member 10 is placed under such tension as to prevent any looseness or play in the recess in which it is slidably disposed.

It is needless to add to the above that, when the attachment is secured to the chuck head 1, the annular shoulder 21 at the end of the air passage 8 upon which the gasket 4 seats effects a clamping of said gasket against an annular shoulder 22 in the chuck head, and thereby prevents leakage of air through the threaded connection between the chuck head and the threaded sleeve 6 of the attachment. Preferably, however, an additional washer 23 is provided to increase the leak-proof character of the joint.

What I claim as new and desire to secure by Letters Patent is:

1. A locking device of the class described, comprising a body portion having a threaded connection at one side thereof adapted to receive an air line and having an air passage therethrough, and a semi-circular depression at one side of the passage intermediate its length, an arcuate locking element slidably mounted in said depression for movement transversely of the air passage and having an outer camming surface, a rotary member interlocked with the body portion and provided with retaining means cooperative with the locking element to hold it in the semi-circular depression, camming means operable by rotation of the rotary member in one direction to shift the locking element transversely of the air passage, stop means for limiting movement of the locking element as aforesaid, and means for shifting the locking element in the opposite direction upon reverse rotation of the rotary member.

2. A combined air chuck and locking connector comprising a head, valve means in said head, a disc-like member provided with a threaded connection at one side to receive the head and an air passage therethrough and a semi-circular depression at its other side, a compressible gasket between said disc-like member and said head, said gasket constituting a valve seat for said valve means, a locking element carried by said disc-like member in said semi-circular depression, and a rotatable cap therefor secured to the disk-like member for holding said locking member in the depression of said disc-like member and for operating said locking member to shift the same transversely of the air passage.

3. A locking device of the class described, comprising a body member having a threaded connection at one end for connecting the same to an air chuck or the like and an air passage therethrough, said body member having a semi-circular depression at its other end forming a stop shoulder at one side of said depression, a locking member mounted in said depression to slide transversely of the air passage and limited in its movement in one direction by said shoulder, spring means intermediate the body and the locking member to move the locking member away from said shoulder in release position, and a cap rotatably mounted on the body for holding the locking member and the spring in cooperative relation in the depression and having means for moving the locking member transversely of the air passage and toward said shoulder, said cap member having an inturned flange for interlocking the cap member on the body member.

4. A locking device of the class described, comprising a body member having a chuck head receiving extension at one end and formed with a valve stem receiving air passage therethrough, said body member being formed with a semi-circular depression in its other end and an arcuate recess opening at its opposite ends into said depression, an arcuate shaped locking detent member disposed in said depression having an inner valve stem engaging knife edge portion adapted to be projected into said air passage and having an outer peripheral portion formed with a dwell and a gradually inclined camming surface, a semi-circular spring disposed in said arcuate recess under tension with its ends engaging said detent to move the same out of said air passage, and a retainer cap rotatably secured on the end of the body member for retaining said detent and spring in their respective depression and recess, said cap being formed with an inwardly extending projection normally extending into said dwell in the detent and movable with the cap into engagement with said camming surface for moving said detent into the said air passage when the cap is rotated in one direction, said cap being formed with an air passage concentric with the air passage in the body member.

5. An air chuck locking device of the class described comprising a body member formed with a tire valve stem receiving air passage therethrough, means for securing the body member to an air supply line at one end, the body member being formed at the other end with a semicircular depression and a connecting arcuate recess formed in the end of the body on opposite sides of the air passage and having stop shoulders arranged in the plane of connection of the recess and depression, an arcuate shaped locking detent member freely and movably disposed in said depression and formed with a tire valve stem engaging inner portion movable into the air passage to engage a tire valve stem, said detent being also formed with a dwell and a gradually inclined outer peripheral cam portion and having spaced shoulders at its opposite ends for engagement with the said shoulders on the body member to limit movement of the detent in one direction, a leaf spring disposed in the arcuate recess of the body member with its ends engaging the shoulders of the detent to move the detent out of the air passage, and a cup shaped retainer cap for the end of the body member enclosing said detent and spring and rotatably secured onto the body member, said cap being formed with a tire stem receiving opening concentric with the air passage in the body and having an inwardly extending projection normally seated in said dwell of the detent and engageable with the said inclined camming surface thereof to cam the detent inwardly into locking engagement with a tire valve stem when inserted in the air passage upon rotation of the cap in one direction.

6. A locking device of the class described, comprising a body member having an air line connection at one end and formed with a communicating air passage extending centrally therethrough adapted to receive a tire valve stem, said body member being formed with a semi-circular step-down portion extending from the central passage outwardly, a flat somewhat semi-circular locking detent slidably positioned on said step-down portion having an outer camming edge and an inner tire valve stem engaging edge movable into the air passage in the body member, an actuating cap rotatably interlocked on the body and extending in spaced relation across the step-down portion of the body member to retain said locking detent thereon, said cap being formed with a tire valve stem receiving opening in register with the tire valve stem receiving opening in the body, and an actuating projection engaging the camming surface of said detent to move the detent into the valve stem receiving passage in the body upon rotation of the cap in one direction, and resilient means between the body member and the detent for moving the detent outwardly with respect to the central opening in the body upon rotation of the cap in the opposite direction.

7. In a locking device of the class described, a body member having an air line connection at one end and formed with a communicating air passage extending centrally therethrough adapted to receive a tire valve stem, said body member having formed thereon a step-down semicircular locking detent receiving portion extending from the central air passage outwardly with stop shoulders at opposite sides of said air passage, a flat arcuate shaped locking detent slidably disposed on the step down portion of the body and formed with a valve stem engaging knife edge portion movable into the central air passage of the body to engage a tire valve stem when inserted in said passage, said detent having formed thereon stop shoulders at opposite sides of the knife edge portion for engagement with the stop shoulders on the body to limit the inward movement of the detent toward the air passage and an outer camming edge, a cap rotatably secured on the end of the body and extending across said step-down portion in spaced relation thereto and formed with a central valve stem receiving opening in register with the central opening in the body, detent actuating means projecting inwardly from the cap to engage the camming portion of the detent, and resilient means between the detent and the body engaging the spaced shoulders on the detent for shifting said detent outwardly away from the stop shoulders on the body.

8. In a tire inflation chuck, a body having a connection at one side adapted to be connected to an air line and formed with an air passage extending therethrough for the reception of a tire valve stem, said body having a semi-circular step-down portion on its opposite side forming stop shoulders extending diametrically across the body at each side of the air passage, a flat substantially semi-circular locking detent disposed on the step down portion of the body, said detent having a knife edge portion at one side movable into the air passage of the body to engage a tire valve stem when positioned therein and stop shoulders disposed at opposite sides of the knife edge portion to engage the stop shoulders on the body to limit inward movement of the locking detent toward the valve stem opening in the body, said locking detent having its outer edge portion formed eccentrically with respect to the circular knife edge portion to provide a camming edge, and a cup-shaped cylindrical retaining cap member rotatably secured on the end of the body to retain said locking detent on said semi-circular step-down portion, said retaining cap member being formed with a central valve stem receiving opening extending therethrough in register with the valve stem receiving air passage in the body and having an inner camming projection engaging the camming edge of the locking detent member to move the same toward the air passage in the body upon rotation of the cap in one direction, and resilient means between the detent and the body for moving the detent away from the air passage upon reverse rotation of the cap.

9. In a tire inflation chuck, a cylindrical body having a connection at one side adapted to be secured to an air line and formed with a central tire valve stem receiving opening therethrough, said body having a step-down portion at its other side dividing the end of the body into two semi-circular flat surfaces at opposite sides of the tire valve stem receiving opening and disposed in parallel planes at different distances from the air line connection aforesaid, said body being formed with a spring receiving groove in the outermost semi-circular flat surface with the ends of said groove opening into the step-down portion aforesaid, an arcuate flat locking plate disposed on the step-down portion of the body and having a knife edge portion projecting toward the central air passage and an outer camming edge opposite to the knife edge portion, a spring disposed in the spring groove aforesaid in the body with its opposite ends engaging the locking plate at opposite sides of its knife edge portion to move the locking plate outwardly with respect to the valve stem receiving passage, and a circular retaining cap having a central aperture in register with the air passage in the body and rotatably secured over the end of the body to slidably retain the locking detent on the step-down portion of the body, an inwardly extending projection formed on said cap engaging the camming surface of the detent to move the same inwardly toward the central passage in the body upon rotation of the cap in one direction.

WALTER H. LONGSTREET.